W. A. J. HODO.
COTTON GINNING, CLEANING, AND BLEACHING MECHANISM.
APPLICATION FILED APR. 18, 1916.
1,203,739.
Patented Nov. 7, 1916.
3 SHEETS—SHEET 1.
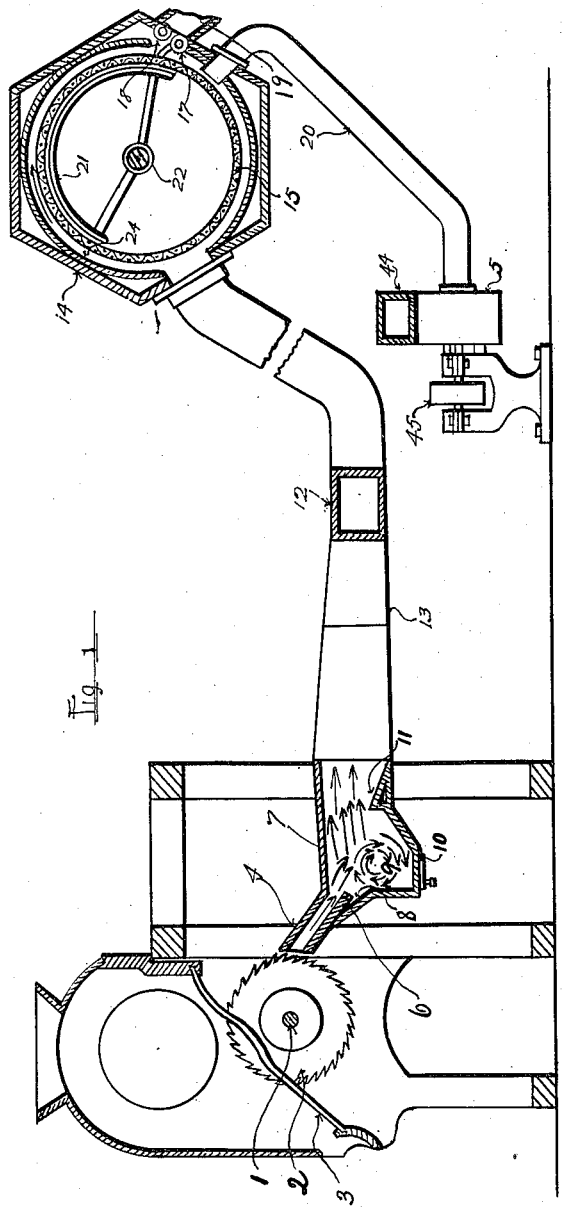
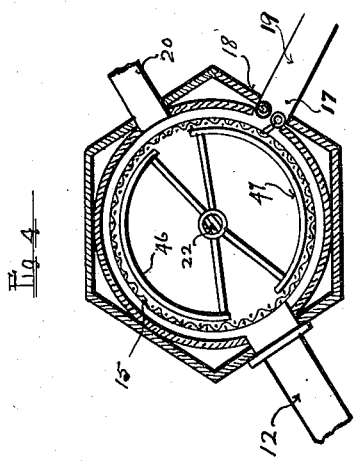
Inventor,
W. A. J. Hodo,
By A. D. Jackson,
Attorney

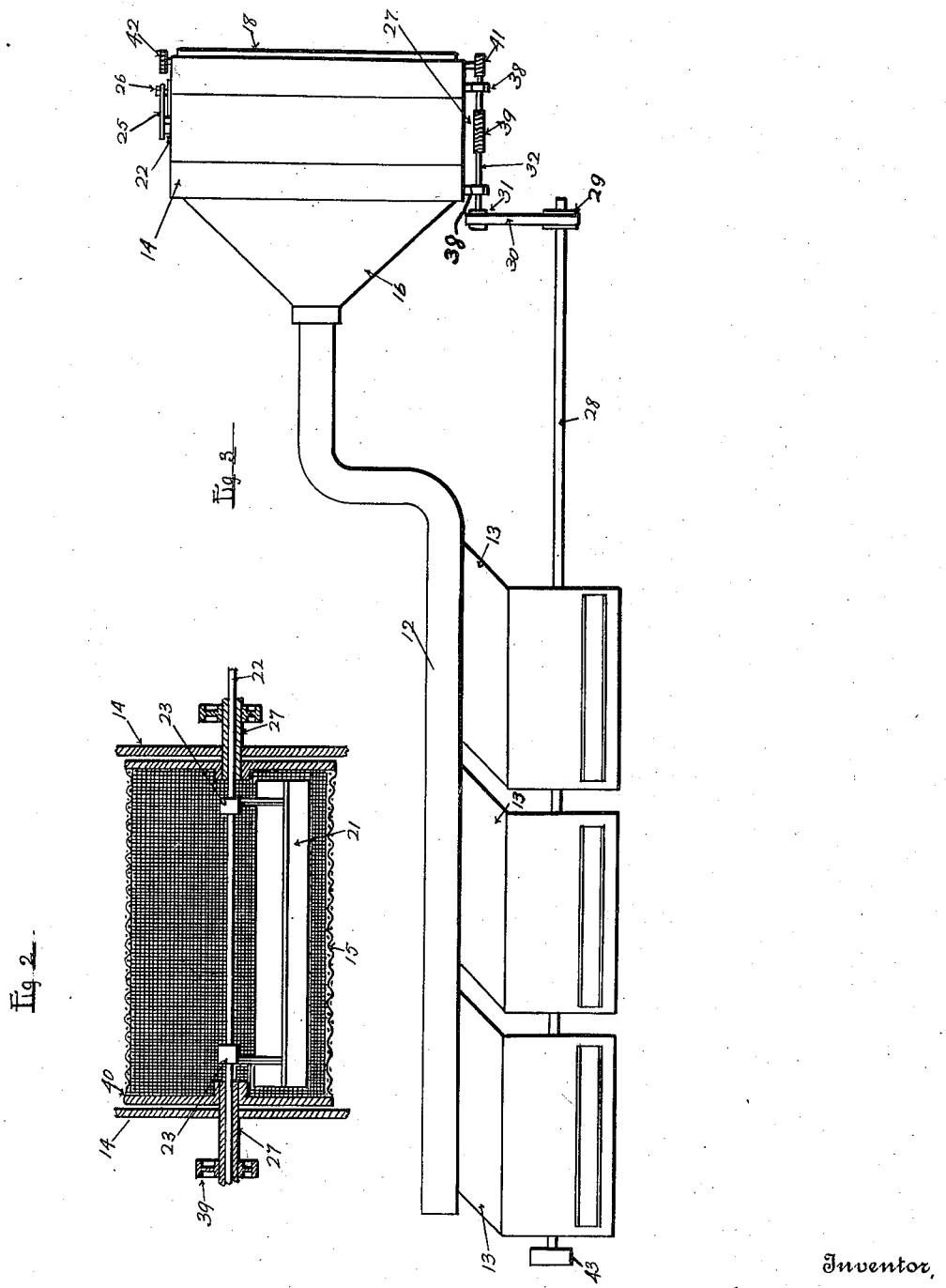

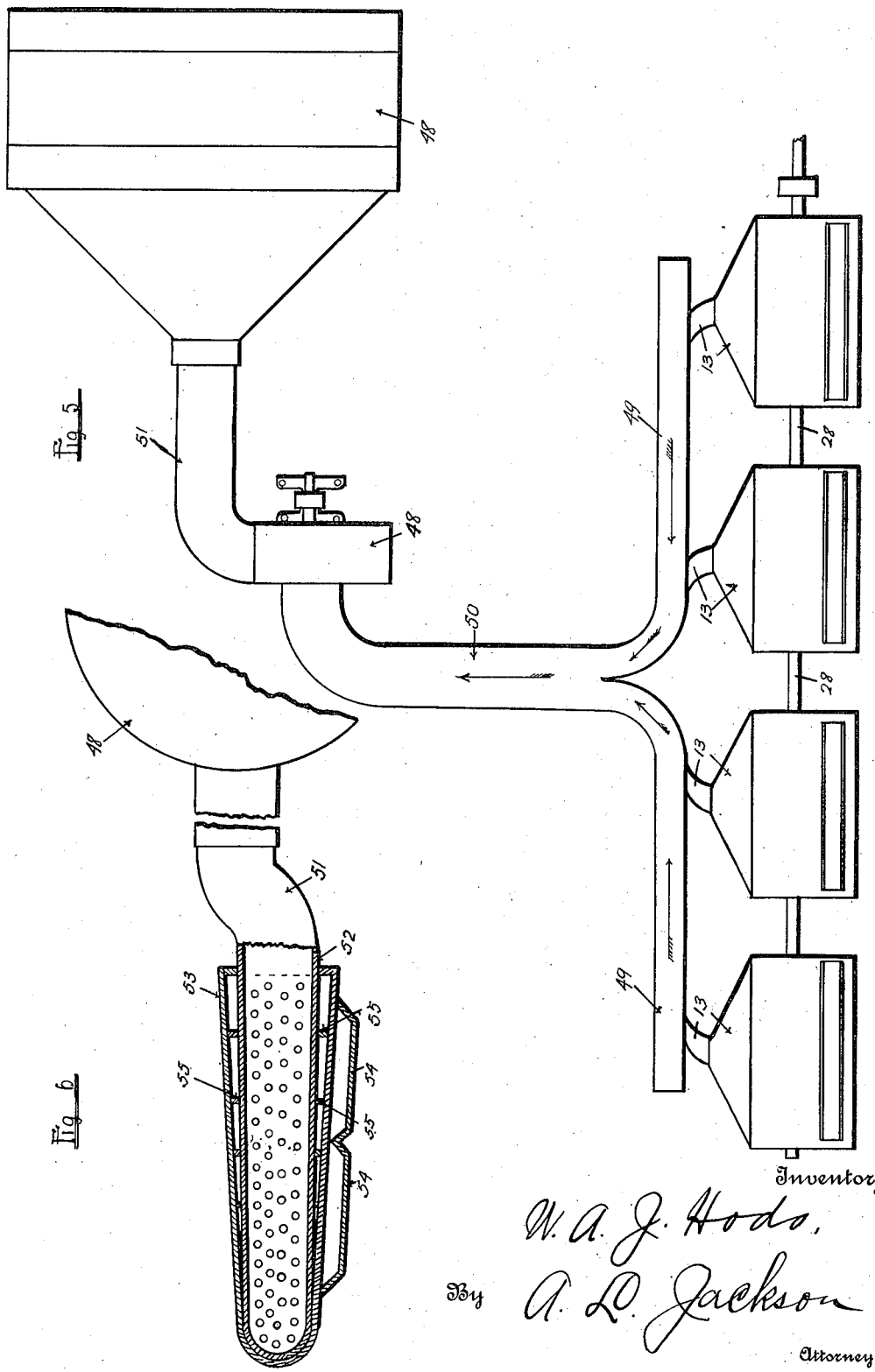

UNITED STATES PATENT OFFICE.

WESLEY A. J. HODO, OF CLEBURNE, TEXAS.

COTTON GINNING, CLEANING, AND BLEACHING MECHANISM.

1,203,739. Specification of Letters Patent. Patented Nov. 7, 1916.

Application filed April 18, 1916. Serial No. 91,862.

*To all whom it may concern:*

Be it known that I, WESLEY A. J. HODO, a citizen of the United States, residing at Cleburne, in the county of Johnson and State of Texas, have invented certain new and useful Improvements in Cotton Ginning, Cleaning, and Bleaching Mechanism, of which the following is a specification.

This invention relates to cotton gins and the objects of the same are to provide means for removing lint from the gin saw teeth in a positive and practical and highly efficient manner; to provide means for treating the cotton with air after it leaves the gin saw teeth for the purpose of cleaning and bleaching the cotton, and to provide efficient means for taking care of the cotton after it leaves the saw teeth. It is old in the art to strip the lint cotton from the saw teeth with either a blast or a suction draft, but so far as I know there is no gin which successfully strips the lint cotton from the saw by a suction draft of air. One difficulty has been to take care of the cotton in an efficient manner after it leaves the saw teeth. I have provided practical means for condensing the cotton for the press.

Another object is to improve the grade of the lint cotton by cleaning the cotton after it leaves the saw teeth.

Another object is to make provisions for treating the cotton with air after the cotton leaves the gin saw teeth for the purpose of removing shale and dirt and dust and for bleaching the cotton.

It is well known that seed cotton is often dark or stained from exposure to rain which beats the cotton to the ground and also stains the cotton from water-soaked bolls and leaves. Much seed cotton is stained yellow from the bolls, caused by frost on the bolls before the bolls open. One of the principal features of this invention is to clean and at the same time treat the cotton with air after it leaves the saw teeth for the purpose of removing the stains from the cotton.

Other objects and advantages will be fully explained in the following description, and the invention will be more fully pointed out in claims.

Reference is had to the accompanying drawings which form a part of this application.

Figure 1 is a vertical section of a gin frame and the air suction attachment and a section of the condenser. Fig. 2 is a longitudinal section of the revolving screen drum of the condenser showing the position of the wind shield in the condenser. Fig. 3 is a plan view of three gins and a condenser and the flues connecting the gins with a condenser. Fig. 4 is a vertical section of the condenser showing a slight variation from the condensers previously shown. Fig. 5 is a plan view of a series of gins provided with the improved attachments, but showing a variation in the means for taking the cotton from the cleaning attachments to a condenser. Fig. 6 is a broken vertical section of the flue between the fan and the condenser shown in Fig. 5.

Similar characters of reference are used to indicate the same parts throughout the several views.

A part of a gin frame is shown in Fig. 1, in which is mounted a shaft 1, on which is mounted a gang of saws 2, of the usual construction; 3 indicates the usual ribs of gin. The means for removing the lint cotton from the gin saw teeth consists of a nozzle 4, which communicates with a suction fan 5; the nozzle 4 terminates in close proximity to the saw teeth, being just far enough away from the saw teeth to prevent the saw teeth from striking the nozzle. The nozzle 4, as shown in Fig. 1, illustrates a device which has been successfully used in carrying out the objects above set forth. The position of the nozzle is preferably not lower than the shaft 1 of the gang of saws; the nozzle 4 consists of a hollow structure rectangular in cross section and having the upper and lower walls thereof parallel to each other. The lower wall of the nozzle has a projection 6, terminating within the space adjacent to the cleaning and bleaching chamber 7. The object of this wall 6, projecting into space, is to produce a vacuum or dead air space along a line across the entire nozzle substantially at the point 8. The enlarged space in the chamber 7, causes an eddying of the air as it leaves the nozzle and this eddying is cyclonic in effect, producing a whirling motion of the lint which has been stripped from the saw teeth. In the lower part of the chamber, substantially about the space 9, there will be a dead air space in which dust and dirt and shale will fall on the bottom 10, so that such trash, dirt and shale may be removed. For the purpose of making this operation highly efficient for the purpose set forth, a wind break, or baffle 11 is placed crosswise the chamber 7 and attached to the chamber 7, near the exit thereof. The chamber 7 is connected to a line flue 12 by a short flue 13. The flue 12 leads directly to a condenser 14, in which is mounted the usual revolving screen drum 15. The flue 12 is connected to the condenser 14 by the usual flared flue 16. The condenser 14 is provided with the usual doffing roller 17 and 18 for discharging the cotton through a chute 19, which leads to the press.

The screen drum 15 revolves in the direction indicated by the arrow head and a suction pipe or flue connects the condenser with the fan 5. Within the screen drum 15 is mounted a wind shield 21, which is rigid with a shaft 22, by means of collars 23. The object of the wind shield 21 is to create a dead air space beyond that part of the condenser substantially at the point 24, so that the lint cotton which has been pressed against the screen drum 15 will no longer be pressed against the screen as the screen passes the point 24 so that the doffing roller 17 and 18 will readily discharge the sheet of lint cotton from the condenser through the chute 19. The shaft 22 is made rigid by means of a lever 25, which is rigid with the shaft, and which may be attached rigidly to the side of the condenser 14 by means of the screw bolt 26. In this manner the wind shield can be adjusted to the desired position to make the releasing of the cotton from the screen drum easily accomplished. The screen drum is mounted on sleeves 27, which revolve on the shaft 21; instead of driving the shaft 22, the sleeves 27 are driven. The condenser drum 15 may be driven from the line shaft 28 by means of pulley 29, belt 30 and pulley 31, which is rigid with the shaft 32, which may be journaled in bearings 38, attached to condenser 14. Worm gearing 39 may be used to drive one of the sleeves 27 and the other sleeve will be driven by the head 40 of the screen drum. The doffing rollers 17 and 18 may be driven in any suitable manner as by a worm gearing 41, which drives one of the rollers, and sprocket gearing 42, by which one doffing roller drives the other. The gin shaft 1 may be driven from the same line shaft 28 by means of the pulley 43.

In operation the suction current of air is induced through the nozzle 4 by means of the suction fan 5, which is provided with an exhaust 44. The condenser 14 will also serve as a cleaning device because the dust and dirt and finer portions of trash that may be in the lint cotton will be drawn within and through the screen drum and out the flue 20 and exhaust 44 by the action of the air current. The fan 5 may be driven from any source of power which will drive the pulley 45. The first act of cleaning the cotton after it is drawn from the gin saw through the nozzle 4 takes place in the chamber 7, which is co-extensive with the width of the gang of saws. The cotton is thoroughly treated with air which is rotated rapidly in this chamber. The remaining dust and trash will be taken out through the fan 5. It is apparent that the lint cotton will be treated with the air current all the way through the flues 12 and 13, and to some extent in the condenser 14, but the principal purifying effect will be accomplished in the chamber 7.

Various changes in the sizes, proportions, shapes and arrangements of the flue and the condenser may be made without departing from my invention. In Fig. 4 there are two wind shields 46 and 47 and these may be adjusted to any position desired within the screen drum 15. The suction pipe 20 may be connected at a different place in the condenser 14, as shown by Fig. 4, and the lint chute 19 can also be located at a different point. In Figs. 5 and 6 the suction fan 47 is located between the gins and the condenser 48. The arrangement of the gins may be such as to accommodate them to the gin house. The arrangement shown in Fig. 5 has pipes or flues 49 united to form a single flue 50 which communicates with the fan 47 so that all the cotton would pass through the fan 47 and through the exhaust flue 51 to the condenser 48. When the invention is used, as shown in Fig. 5, cleaning devices may be provided which includes a portion of pipe 52 intercepting the flue 51; this pipe is perforated as shown in Fig. 6 and is surrounded by a closed jacket 53, which is spaced from the perforated pipe 52. This provision will let the dust and dirt or trash escape into the jacket 53 and this dirt and dust and trash will find its way down to the trash boxes 54 from which the dust and dirt and trash can be removed; in order to make the cleaning effective so that the dust and dirt will not be taken up by the current which is moving the cotton, stops 55 are made stationary around the pipe 52 and inside of the jacket 53. These stops will cause the dust and dirt to fall and remain in the boxes 54. The devices shown in Figs. 5 and 6 may be considered alternative with the devices shown in the previous views.

The arrangement of the parts, that is, the flues 13 and 12, and the condenser, as shown in Figs. 1 and 3, are merely diagrammatic and may be arranged in any suitable manner and accomplish the work of taking care of the cotton after it leaves the chamber 7. Any suitable number of gins may be connected in series to form a battery of gins. With this arrangement there are no vent flues going out through the roof. There will be no accumulation of dirt and dust and trash in the lint flues or condenser, as the dust and dirt and trash will go through the fan and out of the gin house.

In order that the suction draft may successfully remove the lint cotton from the saw teeth there must be unobstructed air passages between the saws. On account of the narrow nozzle 4 there will be dead air space at short distances from the nozzle through which the saw teeth pass before and after the teeth pass the nozzle. In the normal operation of the saw teeth, in stripping the lint cotton from the seed, much dust, dirt and shale will be separated from the cotton and fall down below the saws because there is no air current except close to the nozzle to force the dust, dirt and shale through the nozzle.

What I claim, is:

1. In a cotton gin provided with a gang of saws, means for stripping the lint from the saw teeth, consisting of a suction nozzle terminating in close proximity to the path of the saw teeth, and having the upper and lower walls parallel to each other, the passage through said nozzle being straight and uniform, a cleaning chamber communicating with said nozzle, a lint flue leading from said chamber, and means for causing a draft of air through said nozzle and chamber and flue.

2. In a cotton gin provided with a gang of saws having unobstructed air passages between the saws, means for stripping the lint cotton from the saw teeth, consisting of a nozzle co-extensive with a gang of saws and terminating in close proximity to the saws, and having the upper and lower walls parallel to each other, the passage through said nozzle being straight and of shallow depth and uniform, and means for causing a suction draft through said nozzle.

3. In a cotton gin provided with a gang of saws having unobstructed air passages between the saws, means for stripping the lint cotton from the saws, consisting of a nozzle having the receiving end terminating in close proximity to the saw and having its upper and lower walls parallel to each other, and having an off-set at its discharge end, an enlarged chamber commencing at said off-set and being co-extensive in width with said nozzle and means for causing a suction draft through said nozzle.

4. In a cotton gin provided with a gang of saws having unobstructed air passages between the saws, means for stripping the lint cotton from said saws consisting of a nozzle having its receiving end terminating in close proximity to the saws, a relatively large cleaning chamber co-extensive in width with said nozzle, and a baffle in line with said nozzle on the side of said chamber opposite the nozzle, a lint flue in communication with said cleaning and purifying chamber and means for causing an air current through said nozzle and chamber and flue.

5. In a cotton gin provided with a gang of saws, means for stripping lint cotton from the saws consisting of a suction fan provided with an exhaust, a nozzle having its receiving end terminating in close proximity to said teeth, a lint flue in communication with said nozzle and with said fan, and an enlarged closed chamber between said nozzle and said flue and communicating with the nozzle and flue and means in connection with said chamber and flue for causing a revolving motion of the draft and cotton.

6. In a cotton gin provided with a gang of saws, means for stripping lint cotton from the saws consisting of a flue having a nozzle in close proximity to said saws and an enlarged portion forming an offset in the passage at the termination of said nozzle and having a baffle in line with said nozzle for creating a revolving motion of the draft and cotton, and means for creating a suction draft through said flue.

7. In a cotton gin provided with a gang of saws, means for stripping lint cotton from said saws consisting of a suction fan provided with an exhaust, a flue connected with said fan and having a nozzle in close proximity to said saws and an enlarged portion therein forming an off-set at the termination of said nozzle for sudden expansion of the draft, a baffle in said enlarged portion in line with said nozzle for aiding in creating a revolving motion of the draft, and means between said enlarged portion and said fan for condensing and removing the lint cotton from the suction draft prior to its passage through said fan.

8. In a cotton gin provided with a gang of saws, means for stripping lint cotton from the saws and for purifying and cleaning the same consisting of a lint flue having a relatively long nozzle in close proximity to said saws and a straight passage of shallow depth and an enlarged portion therein forming an off-set at the termination of said nozzle for sudden expansion of the draft, and means for creating a suction draft through the said flue.

9. In a cotton gin provided with a gang of saws, means for stripping lint cotton from said saws and for purifying and cleaning same, consisting of a lint flue having a nozzle in close proximity to said saws, with its upper and lower wall parallel to each other and forming a straight and shallow passage and having an enlarged portion therein forming an off-set at the termination of said nozzle, a baffle in line with said nozzle for aiding in creating a revolving motion of the draft and cotton, and means for creating a suction draft through said flue.

10. In a cotton gin provided with a gang of saws, means for stripping lint cotton from the saws and for purifying and cleaning the same consisting of a lint flue having a nozzle in close proximity to said saws, with its upper and lower walls close to and parallel with each other, and having an enlarged chamber therein adjacent to said nozzle and forming an off-set with said nozzle on one side and with the flue on the other co-extensive in width with the nozzle for producing a cyclonic effect in the draft and lint cotton transversely of the path of the cotton, and means for creating a suction draft through said flue.

11. In a cotton gin provided with a gang of saws, means for stripping lint cotton from the saws and for purifying and cleaning the same consisting of a nozzle having its receiving end close to the path of the said saws, and forming a relatively long straight and shallow passage coextensive in width with the gang of saws, a cleaning chamber adjacent to said nozzle for producing a cyclonic effect in the draft and lint cotton transversely of the path of the cotton and forming an off-set with the lower side of said nozzle, a lint flue connected to said chamber, and means for creating a suction draft through said nozzle and chamber and flue.

12. In a cotton gin provided with a gang of saws, means for stripping lint cotton from the saws and for purifying and cleaning the same consisting of a nozzle having its receiving end close to the path of said saws, a lint flue, means for creating a suction draft through said nozzle and flue, and an enlarged chamber between said nozzle and flue and closed except to said nozzle and flue for producing a cyclonic effect in the draft and lint cotton transversely of the path of the cotton.

13. In a cotton gin provided with a gang of saws, means for stripping lint cotton from the saws and for treating and cleaning the same consisting of a nozzle having its receiving end close to the path of the saws, a lint flue, means for creating a draft through said nozzle and flue, and means for producing a cyclonic effect in the draft and lint cotton transversely of the path of the cotton.

14. In a cotton gin provided with a gang of saws, means for stripping lint cotton from the saws and for treating and cleaning the same consisting of a relatively long nozzle having its receiving end close to the path of said saws, a lint flue, means for creating a suction draft through said nozzle and flue, means for producing a cyclonic effect in the draft and lint cotton transversely of the path of the cotton for purifying purposes, and a chamber in connection with the latter means for receiving dust, dirt and shale.

In testimony whereof, I set my hand this 10th day of April, 1916.

WESLEY A. J. HODO.